Dec. 18, 1934.   J. THOMPSON   1,985,116
LOCKING BUNG
Filed May 1, 1933
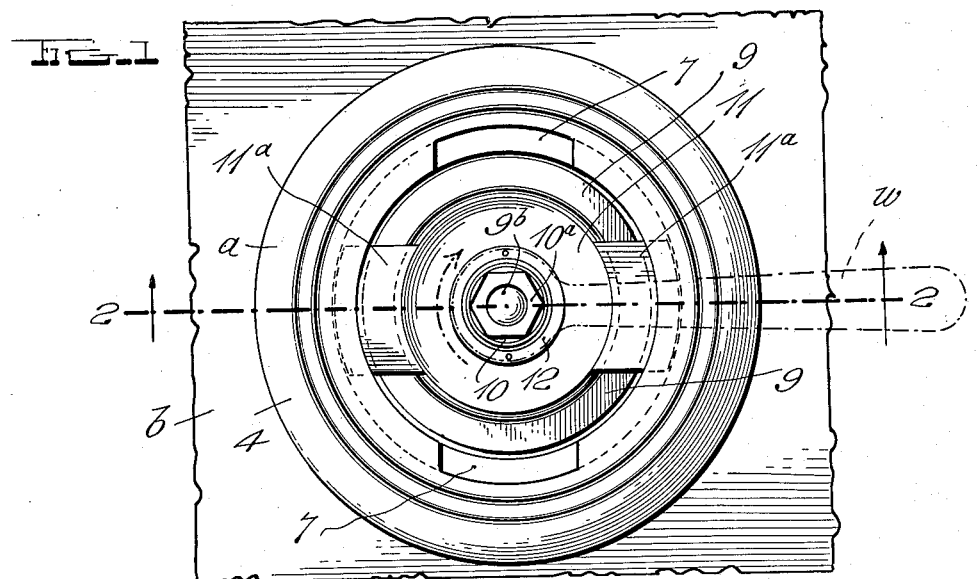
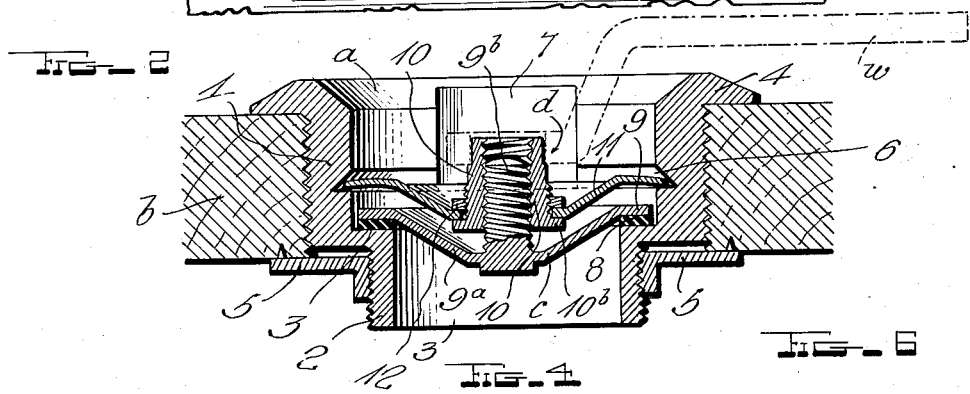
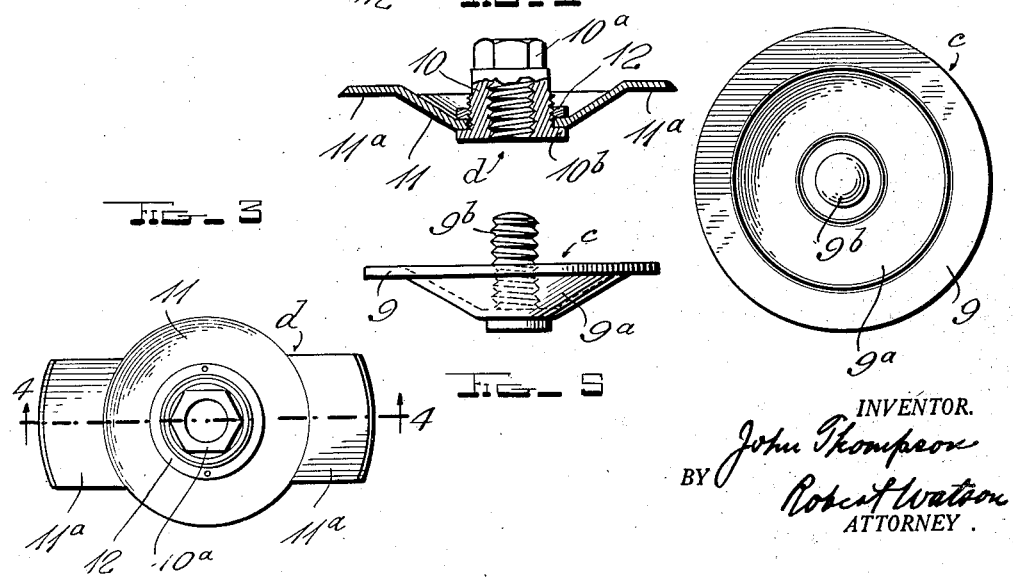
INVENTOR.
John Thompson
BY
Robert Watson
ATTORNEY.

Patented Dec. 18, 1934

1,985,116

UNITED STATES PATENT OFFICE 1,985,116

LOCKING BUNG

John Thompson, Chilton, Wis., assignor of one-half to George C. Hume, Chilton, Wis.

Application May 1, 1933, Serial No. 668,839

1 Claim. (Cl. 217—106)

This invention relates to locking bungs for barrels, kegs and similar vessels and it comprises the features of construction illustrated in the accompanying drawing and hereinafter described.

In the drawing,

Fig. 1 is a plan view of the bung, a wrench for tightening the bung being shown in dotted lines;

Fig. 2 is a section on the line 2—2 of Fig. 1, looking in the direction of the arrows;

Fig. 3 is a plan view of the member for tightening and locking the bung;

Fig. 4 is a section through the same on the line 4—4 of Fig. 3;

Fig. 5 is a side elevation of the bung, and,

Fig. 6 is a plan view of the same.

Referring to the drawing, a indicates a bushing comprising an externally threaded part 1 adapted to be threaded into the bung hole in a barrel stave b, and a part 2 of smaller diameter than part 1, the part 2 being inwardly offset from part 1 to provide an annular shoulder 3 on the interior of the bushing. The bushing has an outer flange 4 adapted to rest against the outer side of the barrel stave and the part 2 is externally threaded to receive a locking ring 5 which is threaded onto said part and engages the inner side of the stave, as shown in Fig. 2. Between the shoulder 3 and the flanged end of the bushing, an annular recess 6 is formed on the inner wall of part 1 and notches or grooves 7 are formed at diametrically opposite points in the inner wall, these notches extending from the flanged end of the bushing to the annular groove.

A packing ring 8 of suitable material rests on the shoulder 3. The bung c comprises a disc having a part 9 at its periphery which lies flat against the packing ring, the central portion 9ª of the disc being dished inwardly, as shown, and at the center of the disc is a stud 9ᵇ which projects toward the outer end of the bushing and has a left-hand screw thread. The stud is either integral with the disc or affixed to it.

A device d, Figs. 2, 3 and 4, is provided for applying pressure to the bung to force it tightly against the packing ring. This device comprises a sleeve nut 10 having internal and external threads and having an angular head 10ª at its outer end and a flange 10ᵇ at its inner end. A disc 11 has a central opening of larger diameter than the sleeve nut and of smaller diameter than its flange and this disc rests upon the flange 10ᵇ and is held in this position by a ring 12 threaded onto the exterior of the sleeve nut, as shown, or otherwise secured thereto. The disc is not clamped tightly against the flange by the ring, but is swiveled on the sleeve nut. The disc flares outwardly from the sleeve nut and has flanges 11ª at its opposite sides adapted to pass through the notches 7, in assembling the parts, and to enter the recess 6 when the disc is turned so that the flanges are out of line with the notches.

When the parts are in the positions shown in Figs. 1 and 2 of the drawing, a wrench w, indicated in dotted lines, is applied to the head of the sleeve nut and by turning the wrench in the clock-wise direction, the stud will be forced inwardly and the sleeve nut will be forced outwardly, and as the bung disc rests against the packing ring and the flanges on the disc carried by the sleeve nut engage the outer wall of the recess 6, these discs will be pressed forcibly in opposite directions and the bung will press the packing ring tightly against the shoulder in the bushing, forming a seal. To release the parts, the wrench will be applied to the sleeve nut and turned in the counter-clock-wise direction.

Right-hand threads are so universally used on bolts and nuts that the natural impulse of one wishing to tighten a nut or bolt is to apply a wrench and turn it in the clock-wise direction. As it is the unscrewing of the sleeve, in the present invention, which causes the tightening of the bung, the sleeve and nut are provided with left-hand threads so that one wishing to tighten the bung may apply the wrench and follow the usual course of turning the wrench in the clock-wise direction to tighten the bung.

What I claim is:

The combination with a bung bushing comprising an externally threaded body portion having a flange at its outer end, an internal shoulder at its inner end, an annular recess in its inner wall between the flanged end and shoulder and notches in its inner wall extending from the flanged end to said recess, of a packing ring on said shoulder, a bung comprising a disc having its peripheral portion bearing on the packing ring and having a threaded stud fixed to its central portion and projecting outwardly, and means for forcing the bung against the packing ring, comprising a sleeve nut on said stud and a member having a swiveled connection with the sleeve nut and having parts adapted to pass through said notches and engage said recess, said stud and nut having left-hand threads.

JOHN THOMPSON.